No. 820,780. PATENTED MAY 15, 1906.
A. E. GUY.
OBTURATOR FOR FLEXIBLE SHAFTS.
APPLICATION FILED JAN. 11, 1906.
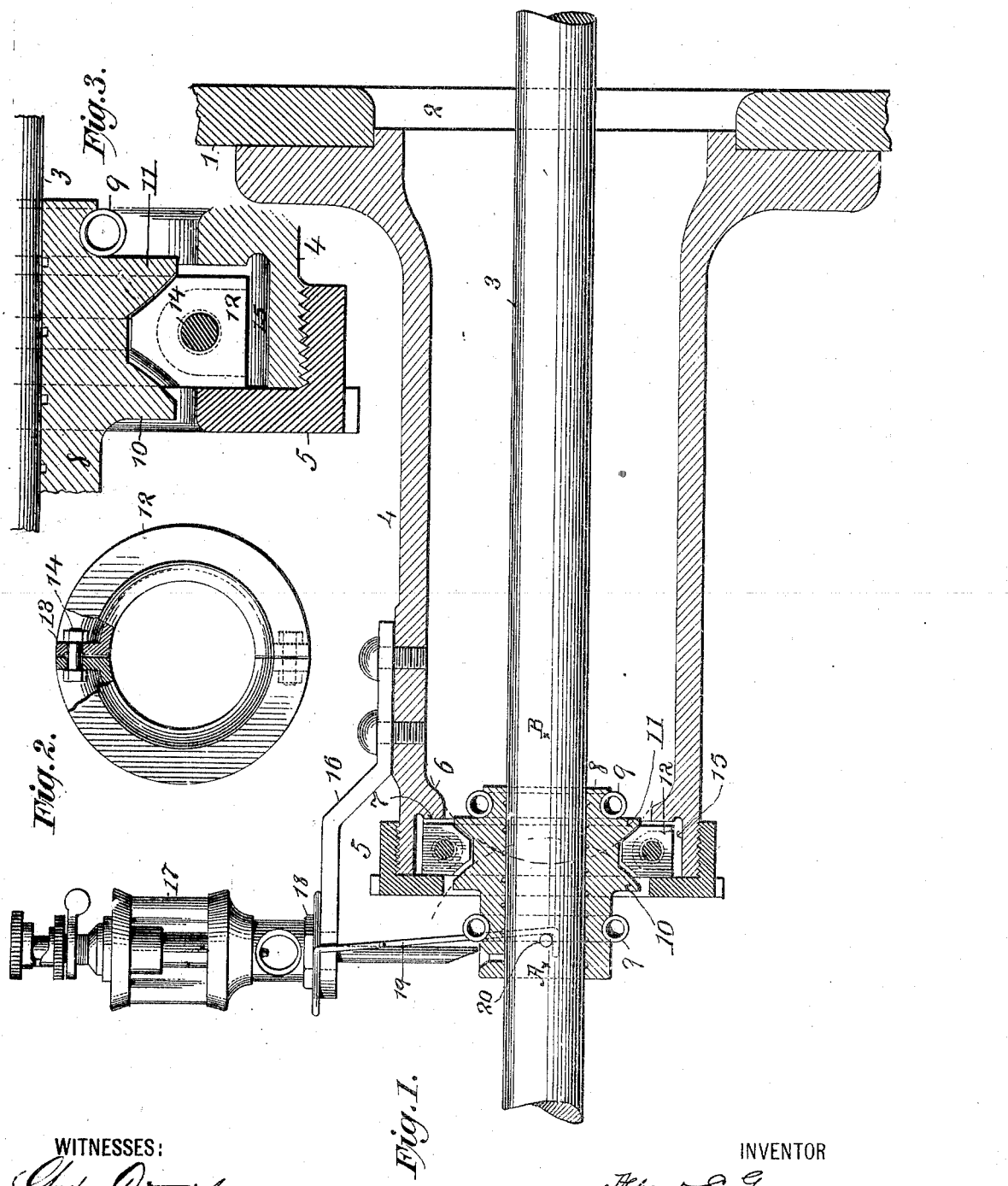
WITNESSES:
INVENTOR

UNITED STATES PATENT OFFICE.

ALBERT E. GUY, OF TRENTON, NEW JERSEY.

OBTURATOR FOR FLEXIBLE SHAFTS.

No. 820,780.

Specification of Letters Patent.

Patented May 15, 1906.

Application filed January 11, 1906. Serial No. 295,655.

*To all whom it may concern:*

Be it known that I, ALBERT E. GUY, a citizen of the United States, residing at Trenton, in the county of Mercer and State of New Jersey, have invented a certain new and useful Improvement in Obturators for Flexible Shafts, of which the following is a specification.

The invention relates to rotary flexible shafts such as are employed in high-speed turbines to support the rotating member and to transmit power therefrom, and more particularly to means for producing a tight joint between said shaft and a wall through which it extends irrespective of the deflections of said shaft due to the lack of balance of the rotating body supported by said shaft. A device of this kind is set forth in United States Patent No. 803,755, granted to me November 7, 1905.

My present invention is a device of similar general character; and it consists, in combination with the casing and flexible supporting-shaft, of an elastic-fluid turbine-wheel in an obturator-ring freely movable in an annular recess in said casing and a ball-and-socket joint between said flexible shaft and said ring.

In the accompanying drawings, Figure 1 is a vertical longitudinal section of my obturator. Fig. 2 shows the obturator-ring separately in face view, a part being broken away to exhibit the mode of connecting the semicircular pieces of which the ring is constructed. Fig. 3 is an enlarged section of a part of the obturator sleeve and ring, showing more clearly the curvatures at the joint between ring and sleeve.

Similar numbers of reference indicate like parts.

1 is a head of the casing in which a turbine-wheel may be inclosed, having a central opening 2. 3 is the flexible shaft carrying said wheel.

4 is a tube entering the opening 2 and having a flange bearing on the casing 1. The outer end of tube 4 is threaded to receive an annular bonnet 5. On the interior of said tube is formed a flange 6, having a face 7 parallel to the inner face of bonnet 5. On the shaft 3 is a sleeve 8, made in two parts, connected by helical spring-bands 9, which bands are received in grooves in said sleeve parts. On said sleeve are two flanges 10 11, the inner faces of which are portions of spherical surfaces struck with equal radii from points, as A B, lying in the axis of shaft 3. The diameter of the flange 11 is less than the diameter of the circular space bounded by the flange 6 as the diameter of flange 10 is less than the diameter of the circular space bounded by the inner edge of the face-wall of bonnet 5. Seated in the channel formed between said flanges 10 11 and having its proximate faces of corresponding curvature is the obturator-ring 12. Said ring is made, preferably, in two parts, having transverse webs 13 at their ends, said webs being connected by bolts 14. The relation, therefore, of each face of the ring to the flange 10 or 11, against which it may bear, is that of a ball-and-socket joint; the ring supplying the socket and the flanges 10 11, in effect, the ball. By reason of this construction and of the further fact that there is clearance 15 around the exterior of the ring the ring will always accommodate itself to any deflection of the shaft 3, while making a tight joint with one or the other flange. If there be vacuum in the turbine-casing, the air-pressure holds the ring tightly against flange 6 and sleeve-flange 11. If, on the other hand, there be pressure above atmosphere in the turbine-casing, said pressure holds the ring against bonnet 7 and sleeve-flange 10.

I find in practice that there may be slight variations of pressure on the ring not sufficient to force it positively into one definite position or the other. To avoid the resulting movement of the ring and possible slight leakage, I provide means for holding one flange of the sleeve normally against the ring by a spring-pressure sufficient to take up said slight variations. Fast on the tube 4 is a bracket 16, which I also utilize for supporting the oil-supply cup 17, carried by the nut 18. Said nut serves to clamp on bracket 16 two depending spring-arms 19, which extend on each side of the sleeve 8 and have bent ends engaging with pins 20 on said sleeve. These springs hold the parts, as indicated in Figs. 1 and 3, with a normal resilient spring-pressure, which prevents separation of said parts under the slight variations of pneumatic pressure above noted.

I claim—

1. In combination with the casing and flexible supporting-shaft of an elastic-fluid turbine-wheel, an obturator-ring freely movable in an annular recess in said casing and a ball-and-socket joint between said shaft on said ring.

2. In combination with the casing and the flexible supporting-shaft of an elastic-fluid turbine-wheel, an obturator-ring surrounding said shaft and movable in an annular recess in a wall of said casing, and a ball-and-socket joint between said shaft and said ring.

3. The combination of a wall having an opening and an annular recess in the peripheral edge surrounding said opening, a ring loosely received in said recess, a flexible shaft, and a sleeve on said shaft surrounded by said ring; the said ring being constructed to form one member and the said sleeve being constructed to form the other member.

4. In combination with a turbine-wheel casing and a flexible shaft for said wheel, an obturator-ring loosely received in an annular recess in said casing and a sleeve on said shaft surrounded by said ring; the said ring being constructed to form one member and the said sleeve being constructed to form the other member of a ball-and-socket joint.

5. In combination with the flexible shaft and the casing of an elastic-fluid turbine, an annular recess in a wall of said casing concentric with said shaft, a loose ring in said recess of less diameter and less width than said recess, and having concavities in its outer faces and a fixed sleeve on said shaft and inclosed by said ring and having flanges with convexities constructed to fit in said ring concavities.

6. In combination with the flexible shaft and the casing of an elastic-fluid turbine, an annular recess in a wall of said turbine concentric with said shaft, a sleeve on said shaft having a circumferential groove with convex sides, and a loose ring in said groove having concave faces shaped to conform to said sides; there being a clearance-space between the bottom of said recess and said ring and between the inner circumferential periphery of the bounding-walls of said recess and said sleeve.

7. In combination with the flexible shaft and the casing of an elastic-fluid turbine, a tube surrounding said shaft supported on said casing and communicating therewith, a sleeve supported on said shaft having a circumferential groove with convex sides, a loose ring in said groove having concave faces shaped to conform to said sides and annular flanges on said tube surrounding said sleeve and disposed respectively on opposite sides of said ring; there being a clearance-space between the bottom of said recess and said ring and between the inner circumferential periphery of the bounding-walls of said recess and said sleeve.

8. In combination with the flexible shaft and the casing of an elastic-fluid turbine, a tube supported on said casing communicating with the interior thereof and inclosing said shaft, an internal flange on said tube, an annular bonnet on the end of said tube having its inner face parallel to a face of said tube-flange, a sleeve on said shaft having flanges, the said flanges having their opposing faces shaped to the annuli of spheres struck on equal radii from points lying in the axis of said shaft, and a loose ring surrounding said sleeve having its outer faces shaped to correspond to said flange-faces—and lying between said bonnet and said internal tube-flange; there being a clearance-space between the circumferential periphery of said ring and said tube and between said sleeve-flanges and the inner circumferential periphery of said annular bonnet and said tube-flange.

In testimony whereof I have affixed my signature in presence of two witnesses.

ALBERT E. GUY.

Witnesses:
 WM. H. SIEGMAN,
 PARK BENJAMIN, Jr.